(12) United States Patent
Tucker

(10) Patent No.: US 11,496,655 B1
(45) Date of Patent: Nov. 8, 2022

(54) TUBULAR VIDEO CAMERA ASSEMBLY

(71) Applicant: Cary Tucker, Chicago, IL (US)

(72) Inventor: Cary Tucker, Chicago, IL (US)

(*) Notice: Subject to any disclaimer, the term of this patent is extended or adjusted under 35 U.S.C. 154(b) by 0 days.

(21) Appl. No.: 17/344,944

(22) Filed: Jun. 11, 2021

(51) Int. Cl.
*H04N 5/225* (2006.01)
*G03B 17/56* (2021.01)

(52) U.S. Cl.
CPC ......... *H04N 5/2252* (2013.01); *G03B 17/561* (2013.01); *G03B 17/565* (2013.01); *H04N 5/2257* (2013.01)

(58) Field of Classification Search
CPC .. H04N 5/2252; H04N 5/2257; G03B 17/561; G03B 17/565
See application file for complete search history.

(56) References Cited

U.S. PATENT DOCUMENTS

| | | | |
|---|---|---|---|
| 5,305,033 A | 4/1994 | Takahashi | |
| 6,877,878 B2 | 4/2005 | Raskas | |
| 9,462,156 B2 | 10/2016 | Storm | |
| 10,323,904 B1 * | 6/2019 | Batten | F41G 3/145 |
| 10,480,776 B1 | 11/2019 | Fultz | |
| D887,053 S | 6/2020 | Fultz | |
| 2006/0125918 A1 * | 6/2006 | Sutton | H04N 7/183 348/148 |
| 2015/0264226 A1 * | 9/2015 | Gafni | G03B 17/08 348/81 |
| 2017/0163942 A1 * | 6/2017 | Teetzel | F41A 17/063 |
| 2018/0262545 A1 | 9/2018 | Alexander | |
| 2019/0353985 A1 * | 11/2019 | Austin | A01K 97/00 |

FOREIGN PATENT DOCUMENTS

WO  WO03009060  1/2003

\* cited by examiner

*Primary Examiner* — Amy R Hsu

(57) ABSTRACT

A tubular video camera assembly for recording photos or video includes a tube which is comprised of a rigid material such that the tube can be gripped by a user. A camera is disposed on an end of the tube to capture imagery in the direction that the tube is pointed. A plurality of first light emitters is disposed on the end of the tube to emit infrared light to facilitate the camera to capture imagery in a darkened environment. A plurality of second light emitters is disposed on the end of the tube to emit light visible light to illuminate a darkened area. A laser light emitter is disposed on the end of the tube to emit a beam of laser light outwardly from the tube for indicating a target of the camera.

5 Claims, 5 Drawing Sheets

TUBULAR VIDEO CAMERA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to video camera devices and more particularly pertains to a new video camera device for recording photos or video. The device includes a tube, a camera disposed on an end of the tube and a laser pointer disposed on the end of the tube to assist with aiming the camera. Additionally, a plurality of light emitters, each emitting visible light or infrared light, is disposed on the end of the tube. A card reader is integrated into the tube to facilitate photos and video recorded by the camera to be stored on a memory card.

(2) Description of Related Art Including Information Disclosed Under 37 CFR 1.97 and 1.98

The prior art relates to video camera devices including a video camera that includes a flashlight that is integrated into the video camera. The prior art discloses a variety of flashlight devices that include a video camera disposed on an end of a flashlight for recording video. In at least one instance the device is in wireless communication with an extrinsic communication network for downloading video footage.

BRIEF SUMMARY OF THE INVENTION

An embodiment of the disclosure meets the needs presented above by generally comprising a tube which is comprised of a rigid material such that the tube can be gripped by a user. A camera is disposed on an end of the tube to capture imagery in the direction that the tube is pointed. A plurality of first light emitters is disposed on the end of the tube to emit infrared light to facilitate the camera to capture imagery in a darkened environment. A plurality of second light emitters is disposed on the end of the tube to emit light visible light to illuminate a darkened area. A laser light emitter is disposed on the end of the tube to emit a beam of laser light outwardly from the tube for indicating a target of the camera.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
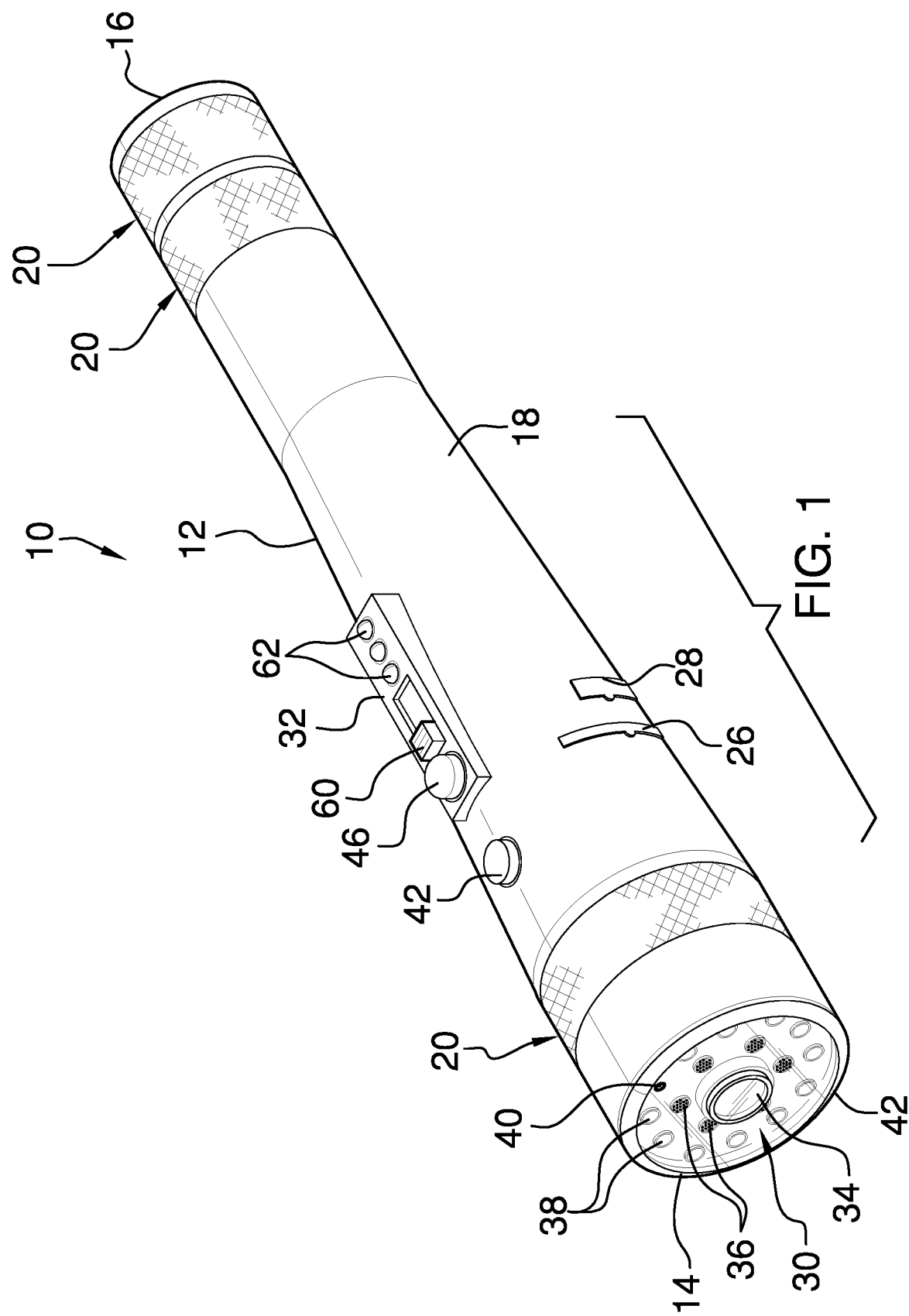
FIG. 1 is a perspective view of a tubular video camera assembly according to an embodiment of the disclosure.
Figure 2:
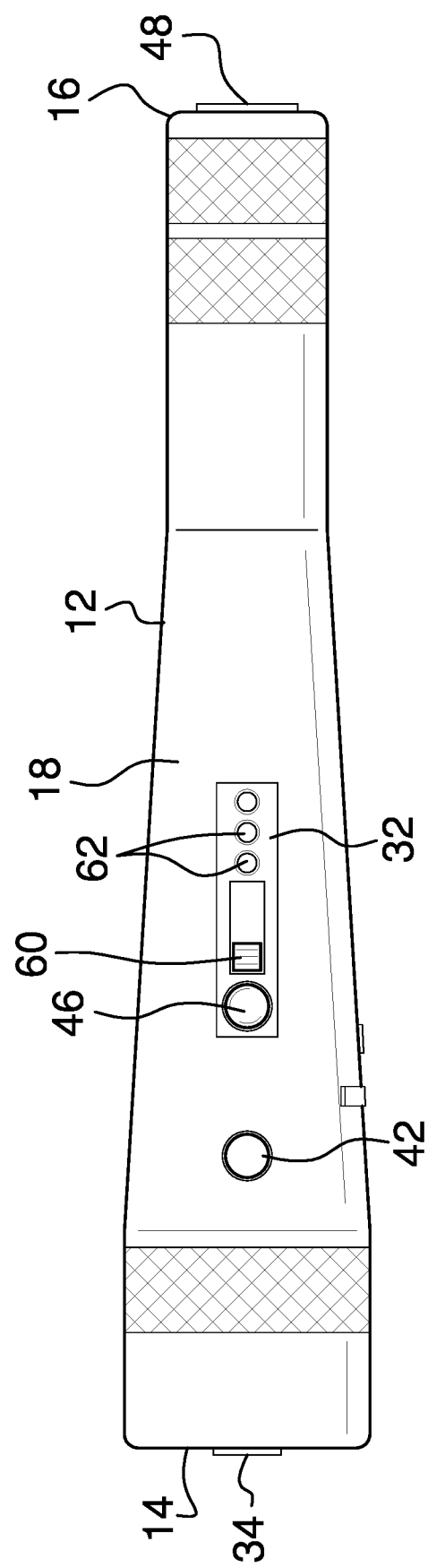
FIG. 2 is a top view of an embodiment of the disclosure.
Figure 3:
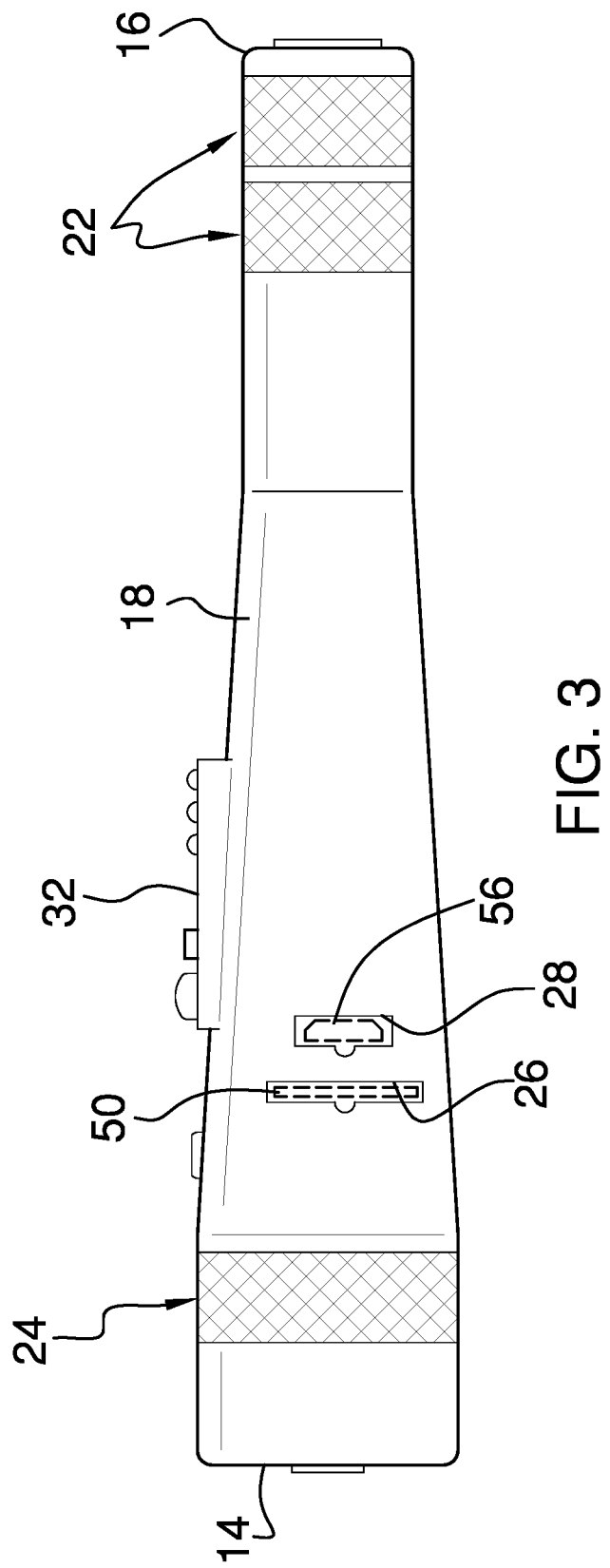
FIG. 3 is a left side view of an embodiment of the disclosure.
Figure 4:
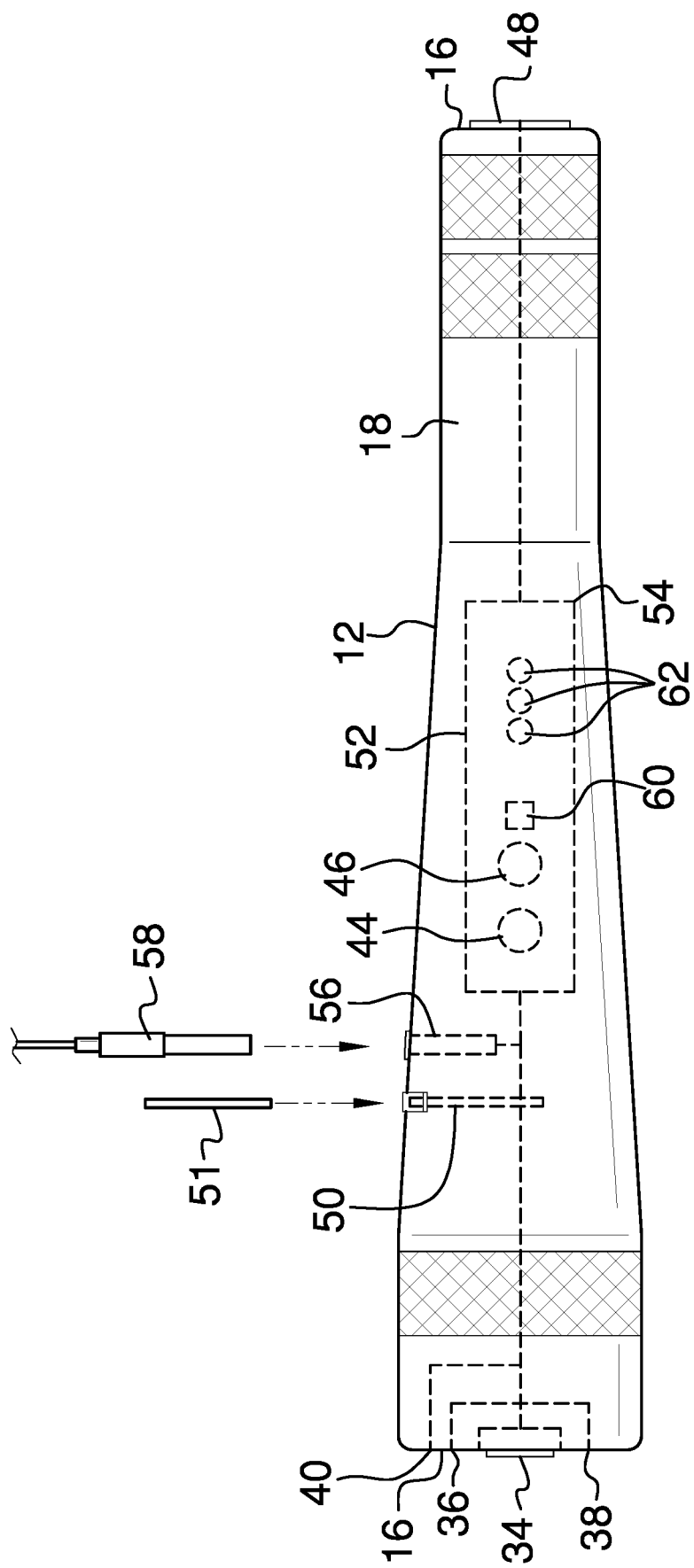
FIG. 4 is a bottom phantom view of an embodiment of the disclosure.
Figure 6:
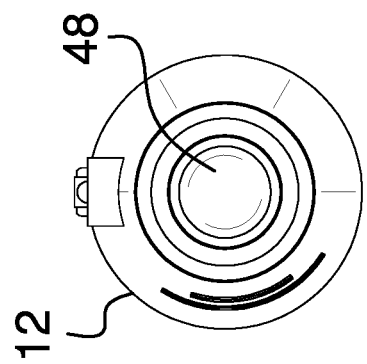
FIG. 6 is a back view of an embodiment of the disclosure.
Figure 5:
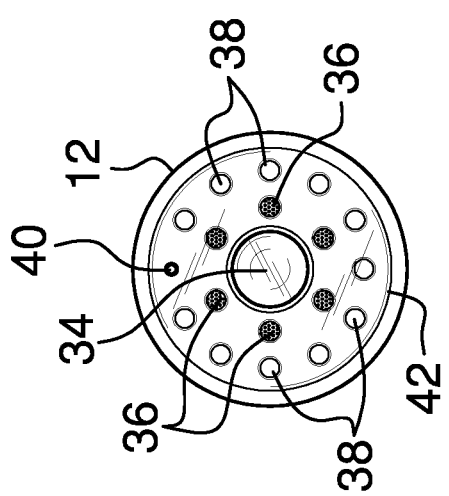
FIG. 5 is a front view of an embodiment of the disclosure.

With reference now to the drawings, and in particular to FIGS. 1 through 6 thereof, a new video camera device embodying the principles and concepts of an embodiment of the disclosure and generally designated by the reference numeral 10 will be described.

As best illustrated in FIGS. 1 through 6, the tubular video camera assembly 10 generally comprises a tube 12 that is comprised of a rigid material, such as aluminum or the like, such that the tube 12 can be gripped by a user. The tube 12 has a first end 14, a second end 16 and an outer wall 18 extending therebetween, and the outer wall 18 flares outwardly between a point located adjacent to the second end 16 and the first end 14. Thus, the first end 14 has a diameter that is greater than the diameter of the second end 16. The outer wall 18 has a plurality knurled sections 20 and each of the knurled sections 20 extends around a full circumference of the outer wall 18. The plurality of knurled sections 20 includes a pair of first sections 22 that are positioned adjacent to the second end 16 and the plurality of knurled sections 20 includes a second section 24 is positioned adjacent to the first end 14. The outer wall 18 has a card slot 26 extending into an interior of the tube 12, the outer wall 18 has a charge slot 28 extending into the interior of the tube 12 and the first end 14 has a well 30 extending toward the second end 16. The outer wall 18 has a flattened section 32 extending along a line which extends between the first end 14 and the second end 16 of the tube 12. Additionally, the flattened section 32 is positioned closer to the first end 14 than the second end 16.

A camera 34 is disposed on an end of the tube 12 to capture imagery in the direction that the tube 12 is pointed. The camera 34 is centrally positioned on the first end 14 of the tube 12 and the camera 34 is positioned in the well 30 on the first end 14. The camera 34 may be a digital camera 34 of any conventional design that can capture both still imagery and video imagery. The camera 34 may include a microphone for recording audio along with the video imagery.

A plurality of first light emitters 36 is each disposed on the end of the tube 12 to emit light outwardly from the tube 12. Each of the first light emitters 36 has an operational frequency in the spectrum of infrared light to facilitate the camera 34 to capture imagery in a darkened environment. Additionally, each of the first light emitters 36 is positioned on the first end 14 of the tube 12, the plurality of first light emitters 36 are spaced apart from each other and are distributed around the camera 34, and each of the first light emitters 36 is positioned in the well 30. Additionally, each of the first light emitters 36 may comprise a light emitting diode or other type of electronic light emitter.

A plurality of second light emitters 38 is each disposed on the end of the tube 12 to emit light outwardly from the first end 14. Each of the second light emitters 38 has an operational frequency in the spectrum of visible light to illuminate a darkened area. The plurality of second light emitters 38 is spaced apart from each other and is distributed around a ring defined by the first light emitters 36. Additionally, each of the second light emitters 38 is positioned in the well 30 and each of the second light emitters 38 may comprise a light emitting diode or other type of electronic light emitter.

A laser light emitter 40 is disposed on the end of the tube 12 to emit a beam of laser light outwardly from the tube 12 for indicating a target of the camera 34. The laser light emitter 40 is positioned on the first end 14 of the tube 12 and the laser light emitter 40 is positioned in the well 30. The laser light emitter 40 may comprise a light emitting diode or other type of electronic light emitter with sufficient intensity to produce a beam of light that can produce a visible spot of light on an object that is up to at least 100.0 feet away. A lens 42 is disposed on the first end 14 of the tube 12, the lens 42 covers the well 30 and the lens 42 is comprised of a translucent material to pass light through the lens 42.

A laser button 44 is movably integrated into the tube 12 and the laser button 44 is electrically coupled to the laser light emitter 40 for turning the laser light emitter 40 on and off. The laser button 44 is positioned on the outer wall 18 of the tube 12 and the laser button 44 is positioned between the flattened section 32 of the outer wall 18 of the tube 12 and the first end 14 of the tube 12. A photo button 46 is movably integrated into the tube 12 and the photo button 46 is electrically coupled to the camera 34. The camera 34 is actuated to take a photo when the photo button 46 is depressed and the photo button 46 is positioned on the flattened section 32 of the outer wall 18 of the tube 12. Additionally, the photo button 46 is electrically coupled to the plurality of first light emitters 36 and the plurality of second light emitters 38, and each of the first light emitters 36 and the second light emitters 38 is turned on when the photo button 46 is depressed.

A record button 48 is movably integrated into the tube 12 and the record button 48 is electrically coupled to the camera 34. The camera 34 is actuated to record video when the record button 48 is depressed and the record button 48 is positioned on the second end 16 of the tube 12. The record button 48 is electrically coupled to the plurality of first light emitters 36 and the plurality of second light emitters 38, and each of the first light emitters 36 and the second light emitters 38 is turned on when the record button 48 is depressed. A card reader 50 is integrated into the tube 12 and the card reader 50 is electrically coupled to the camera 34. The card reader 50 is aligned with the card slot 26 in the outer wall 18 of the tube 12 to receive a memory card 51 for storing the photos and video recorded by the camera 34. The memory card 51 may be an SD card or other type of miniaturized, solid state memory card.

A power supply 52 is integrated into the tube 12 and the power supply 52 is electrically coupled to the laser button 44, the photo button 46 and the record button 48. The power supply 52 comprises a rechargeable battery 54 that is positioned within the tube 12 and the rechargeable battery 54 is electrically coupled to the laser button 44, the photo button 46 and the record button 48. The power supply 52 includes a charger 56 that is positioned within the tube 12 and the charger 56 is aligned with the charge slot 28 in the outer wall 18 of the tube 12 to receive a charge cord 58. Additionally, the charger 56 is electrically coupled to the rechargeable battery 54 for charging the rechargeable battery 54. The charger 56 may comprise a usb port or other similar type of charger port.

The power supply 52 includes a power button 60 that is movably integrated into the tube 12. The power button 60 is electrically coupled to the rechargeable battery 54 for turning the rechargeable battery 54 on and off. Additionally, the power button 60 is positioned on the flattened section 32 of the outer wall 18 of the tube 12. The power supply 52 includes a plurality of indicators 62 that is each of the indicators 62 is coupled to the tube 12. Each of the indicators 62 is electrically coupled to the rechargeable battery 54 and each of the indicators 62 is turned on to reflect a charge level of the rechargeable battery 54. In this way the plurality of indicators 62 can visually communicate the charge level of the rechargeable battery 54. Each of the indicators 62 is positioned on the flattened section 32 of the outer wall 18 of the tube 12 and each of the indicators 62 may comprise a light emitting diode. Each of the indicators 62 is sequentially actuated in accordance with the charge level of the rechargeable battery 54.

In use, the first end 14 of the tube 12 is directed toward an object or area to be photographed or recorded. The photo button 46 is depressed to take a photo of the object or area, or the record button 48 is depressed to record video of the object or area. The laser button 44 can be depressed for actuating the laser light emitter 40 to emit the beam of laser light. In this way the camera 34 can be precisely aimed by using the beam of laser light to illuminate the target to be photographed or recorded. Additionally, the first light emitters 36 and the second light emitters 38 ensure that the photo or video will be visible under all lighting conditions. The video or photos are recorded onto the memory card for subsequent download onto a personal computer, or the like, for viewing and analysis.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tubular video camera assembly for capturing photos or recording video in any light level, said assembly comprising:
   a tube being comprised of a rigid material wherein said tube is configured to be gripped by a user;
   a camera being disposed on an end of said tube wherein said camera is configured to capture imagery in the direction that said tube is pointed;
   a plurality of first light emitters, each of said first light emitters being disposed on said end of said tube wherein each of said first light emitters is configured to emit light outwardly from said tube, each of said first light emitters having an operational frequency in the spectrum of infrared light wherein each of said first light emitters is configured to facilitate said camera to capture imagery in a darkened environment;
   a plurality of second light emitters, each of said second light emitters being disposed on said end of said tube wherein each of said second light emitters is configured to emit light outwardly from a first end, each of said second light emitters having an operational frequency in the spectrum of visible light wherein each of said second light emitters is configured to illuminate a darkened area;
   a laser light emitter being disposed on said end of said tube wherein said laser light emitter is configured to emit a beam of laser light outwardly from said tube for indicating a target of said camera; and
   a card reader being integrated into said tube, said card reader being electrically coupled to said camera, said card reader being aligned with a card slot in said outer wall of said tube wherein said card reader is configured to receive a memory card for storing the photos and video recorded by said camera;
   wherein said tube has a first end, a second end and an outer wall extending therebetween, said outer wall flaring outwardly between a point located adjacent to said second end and said first end such that said first end has a diameter being greater than the diameter of said second end;
   wherein said outer wall has a plurality knurled sections, each of said knurled sections extending around a full circumference of said outer wall, said plurality of knurled sections including a pair of first sections being positioned adjacent to said second end, said plurality of knurled sections including a second section being positioned adjacent to said first end;
   wherein said outer wall has a card slot extending into an interior of said tube;
   wherein said outer wall has a charge slot extending into said interior of said tube;
   wherein said first end has a well extending toward said second end; and
   wherein said outer wall has a flattened section extending along a line extending between said first end and said second end of said tube, said flattened section being positioned closer to said first end than said second end.

2. The assembly according to claim 1, wherein:
   said camera is centrally positioned on said first end of said tube, said camera being positioned in said well on said first end;
   each of said first light emitters is positioned on said first end of said tube, said plurality of first light emitters being spaced apart from each other and being distributed around said camera, each of said first light emitters being positioned in said well;
   said plurality of second light emitters is spaced apart from each other and being distributed around a ring defined by said first light emitters, each of said second light emitters being positioned in said well;
   said laser light emitter being positioned on said first end of said tube, said laser light emitter being positioned in said well; and
   said assembly includes a lens being disposed on said first end of said tube, said lens covering said well, said lens being comprised of a translucent material wherein said lens is configured to pass light through said lens.

3. The assembly according to claim 1, further comprising:
   a laser button being movably integrated into said tube, said laser button being electrically coupled to said laser light emitter for turning said laser light emitter on and off, said laser button being positioned on said outer wall of said tube, said laser button being positioned between said flattened section of said outer wall of said tube and said first end of said tube;
   a photo button being movably integrated into said tube, said photo button being electrically coupled to said camera, said camera being actuated to take a photo when said photo button is depressed, said photo button being positioned on said flattened section of said outer wall of said tube, said photo button being electrically coupled to said plurality of first light emitters and said plurality of second light emitters, each of said first light emitters and said second light emitters being turned on when said photo button is depressed; and
   a record button being movably integrated into said tube, said record button being electrically coupled to said camera, said camera being actuated to record video when said record button is depressed, said record button being positioned on said second end of said tube, said record button being electrically coupled to said plurality of first light emitters and said plurality of second light emitters, each of said first light emitters and said second light emitters being turned on when said record button is depressed.

4. The assembly according to claim 1, further comprising a power supply being integrated into said tube, said power supply being electrically coupled to said laser button, said photo button and said record button, said power supply comprising:
   a rechargeable battery being positioned within said tube, said rechargeable battery being electrically coupled to said laser button, said photo button and said record button;
   a charger being positioned within said tube, said charger being aligned with said charge slot in said outer wall of said tube wherein said charger is configured to receive a charge cord, said charger being electrically coupled to said rechargeable battery for charging said rechargeable battery;

a power button being movably integrated into said tube, said power button being electrically coupled to said rechargeable battery for turning said rechargeable battery on and off, said power button being positioned on said flattened section of said outer wall of said tube; and a plurality of indicators, each of said indicators being coupled to said tube, each of said indicators being electrically coupled to said rechargeable battery, each of said indicators being turned on to reflect a charge level of said rechargeable battery wherein said plurality of indicators is configured to visually communicate the charge level of said rechargeable battery, each of said indicators being positioned on said flattened section of said outer wall of said tube.

5. A tubular video camera assembly for capturing photos or recording video in any light level, said assembly comprising:

a tube being comprised of a rigid material wherein said tube is configured to be gripped by a user, said tube having a first end, a second end and an outer wall extending therebetween, said outer wall flaring outwardly between a point located adjacent to said second end and said first end such that said first end has a diameter being greater than the diameter of said second end, said outer wall having a plurality knurled sections, each of said knurled sections extending around a full circumference of said outer wall, said plurality of knurled sections including a pair of first sections being positioned adjacent to said second end, said plurality of knurled sections including a second section being positioned adjacent to said first end, said outer wall having a card slot extending into an interior of said tube, said outer wall having a charge slot extending into said interior of said tube, said first end having a well extending toward said second end, said outer wall having a flattened section extending along a line extending between said first end and said second end of said tube, said flattened section being positioned closer to said first end than said second end;

a camera being disposed on an end of said tube wherein said camera is configured to capture imagery in the direction that said tube is pointed, said camera being centrally positioned on said first end of said tube, said camera being positioned in said well on said first end;

a plurality of first light emitters, each of said first light emitters being disposed on said end of said tube wherein each of said first light emitters is configured to emit light outwardly from said tube, each of said first light emitters having an operational frequency in the spectrum of infrared light wherein each of said first light emitters is configured to facilitate said camera to capture imagery in a darkened environment, each of said first light emitters being positioned on said first end of said tube, said plurality of first light emitters being spaced apart from each other and being distributed around said camera, each of said first light emitters being positioned in said well;

a plurality of second light emitters, each of said second light emitters being disposed on said end of said tube wherein each of said second light emitters is configured to emit light outwardly from said first end, each of said second light emitters having an operational frequency in the spectrum of visible light wherein each of said second light emitters is configured to illuminate a darkened area, said plurality of second light emitters being spaced apart from each other and being distributed around a ring defined by said first light emitters, each of said second light emitters being positioned in said well;

a laser light emitter being disposed on said end of said tube wherein said laser light emitter is configured to emit a beam of laser light outwardly from said tube for indicating a target of said camera, said laser light emitter being positioned on said first end of said tube, said laser light emitter being positioned in said well;

a lens being disposed on said first end of said tube, said lens covering said well, said lens being comprised of a translucent material wherein said lens is configured to pass light through said lens;

a laser button being movably integrated into said tube, said laser button being electrically coupled to said laser light emitter for turning said laser light emitter on and off, said laser button being positioned on said outer wall of said tube, said laser button being positioned between said flattened section of said outer wall of said tube and said first end of said tube;

a photo button being movably integrated into said tube, said photo button being electrically coupled to said camera, said camera being actuated to take a photo when said photo button is depressed, said photo button being positioned on said flattened section of said outer wall of said tube, said photo button being electrically coupled to said plurality of first light emitters and said plurality of second light emitters, each of said first light emitters and said second light emitters being turned on when said photo button is depressed;

a record button being movably integrated into said tube, said record button being electrically coupled to said camera, said camera being actuated to record video when said record button is depressed, said record button being positioned on said second end of said tube, said record button being electrically coupled to said plurality of first light emitters and said plurality of second light emitters, each of said first light emitters and said second light emitters being turned on when said record button is depressed;

a card reader being integrated into said tube, said card reader being electrically coupled to said camera, said card reader being aligned with said card slot in said outer wall of said tube wherein said card reader is configured to receive a memory card for storing the photos and video recorded by said camera; and a power supply being integrated into said tube, said power supply being electrically coupled to said laser button, said photo button and said record button, said power supply comprising:

a rechargeable battery being positioned within said tube, said rechargeable battery being electrically coupled to said laser button, said photo button and said record button;

a charger being positioned within said tube, said charger being aligned with said charge slot in said outer wall of said tube wherein said charger is configured to receive a charge cord, said charger being electrically coupled to said rechargeable battery for charging said rechargeable battery;

a power button being movably integrated into said tube, said power button being electrically coupled to said rechargeable battery for turning said rechargeable battery on and off, said power button being positioned on said flattened section of said outer wall of said tube; and a plurality of indicators, each of said indicators being coupled to said tube, each of said indicators being electrically coupled to said rechargeable battery, each of said indicators being turned on to reflect a charge level of said rechargeable battery wherein said plurality of indicators is configured to visually communicate the charge level of said rechargeable battery, each of said indicators being positioned on said flattened section of said outer wall of said tube.

\* \* \* \* \*